United States Patent [19]

Plumat

[11] 3,773,529

[45] Nov. 20, 1973

[54] NON-OXIDE GLASS

[75] Inventor: Emile Plumat, Gilly, Belgium

[73] Assignee: Glaverbel, S.A., Watermael Boitsfort, Belgium

[22] Filed: July 1, 1971

[21] Appl. No.: 159,004

Related U.S. Application Data

[63] Continuation of Ser. No. 696,162, Jan. 8, 1968, abandoned.

[30] Foreign Application Priority Data

Jan. 6, 1967   Luxembourg.................... 52,765

[52] U.S. Cl............................................... 106/47 R
[51] Int. Cl............................................... C03c 3/12
[58] Field of Search................ 106/47 R, 47; 65/32; 252/39 DV, 512; 117/201

[56] References Cited
UNITED STATES PATENTS

| | | | |
|---|---|---|---|
| 3,241,009 | 3/1966 | Dewald et al................... | 106/47 UX |
| 3,271,591 | 9/1966 | Ovshinsky....................... | 106/47 UX |
| 3,312,923 | 4/1967 | Eubank............................ | 106/47 X |
| 3,343,972 | 9/1967 | Hilton et al..................... | 106/47 |
| 3,348,045 | 10/1967 | Brau et al........................ | 106/47 X |
| 3,371,211 | 2/1968 | Brau................................. | 106/47 X |
| 3,448,425 | 6/1969 | Shanefield....................... | 106/47 X |
| 3,451,794 | 6/1969 | Patterson......................... | 106/47 X |
| 3,148,998 | 9/1964 | Clearfield........................ | 23/315 X |
| 3,214,241 | 10/1965 | Forber et al..................... | 23/134 |
| 3,224,912 | 12/1965 | Ruehrwein....................... | 23/204 |
| 3,627,573 | 12/1971 | Schottmiller.................... | 106/47 X |

OTHER PUBLICATIONS

Goryonova et al.– Soviet Phys. Solid St. Z pp. 258–261 "Vitreous Semiconductors– Vitrification in Complex Chalcogenides Based on Arsenic Sulfide and Selenide," 1960, QC176S68.

Zhuze et al., "Semiconducting Compounds with the General Formula ABX " Soviet Physics – Tech. Physics Vol. 3, No. 10, Oct. 1958, pp. 1925–1938 QCI.S795 23–315.

Primary Examiner—Helen M. McCarthy
Attorney—Spencer & Kaye

[57]   ABSTRACT

Non-oxide glass composition of BeTe 60%, $TiS_2$ 10 percent, $Li_2S$ 10 percent, $K_2S$ 10 percent and $Cs_2S$ 10 percent by weight.

2 Claims, 2 Drawing Figures

NON-OXIDE GLASS

CROSS-REFERENCE TO RELATED APPLICATION

This application is a continuation of application Ser. No. 696,162 filed Jan. 8th, 1968 now abandoned.

BACKGROUND OF THE INVENTION

The invention relates to vitreous materials and to the preparation thereof.

A considerable number of compositions are known which can form vitreous bodies, e.g., sheet or plate glass or glass balls. In the great majority of cases vitreous bodies are formed of oxides, the most usual one being silicon dioxide which is considered to be a lattice-former and which is used in conjunction with lattice-modifying oxides. However, glasses are also known in which phosphorus or boron oxides are used instead of silicon dioxide. These glasses generally have remarkably high mechanical and chemical strength and advantageous optical properties. Nevertheless, the range of glasses available is not yet adequate to permit vitreous bodies to be used for all of the many industrial purposes for which they are in many respects suited.

The vitreous nature of arsenic suphide and germanium sulphide has also been recognized. These substances have some advantageous properties, but only limited use for them in glass manufacture has been foreseen, due to certain limitations which they possess. For example, arsenic sulphide easily devitrifies and has little resistance to oxidation above 100° C.

SUMMARY OF THE INVENTION

It has been found that useful glasses of a composition based on germanium sulphide can be made by an appropriate selection of one or more other constituents and that in fact, by observing a certain rule in the selection of constituents, glasses can be formed from a wide variety of other compositions the glass-forming properties of which have not hitherto been recognized.

The invention will be explained and defined with reference to FIG. 1 of the accompanying drawings which is a graph wherein the abscissa is a scale of ratios of cation to anion valencies and the ordinate is a scale of ratios of anion radius to cation radius. Any given binary compound can be represented on this graph by a point. Taking germanium sulphide as an example, in this compound the germanium cation has a valency of 4 and the sulphur ions each have a valency of 2. The radius of each sulphur anion is 1.84 A. and the radius of the germanium cation is 0.53 A. Therefore the representative point of germanium sulphide is located opposite the value 2 on the abscissa (cation to anion valency ratio 2:1) and opposite the value 3.47 on the ordinate (anion to cation radius 1.84:0.53). The representative points of germanium sulphide and several other binary compounds are shown on the graph.

Two curves are shown on the graph, so that there are two zones, viz: a zone A located between the upper and lower curves, and a zone B located below the lower curve.

It has been found that glasses can be formed from mixtures of binary compounds selected from classes which will be specified hereafter, provided the selection of compounds is such that the mixture contains at least one binary compound having its representative point in zone A and at least one binary compound having its representative point in zone B of the graph.

As broadly defined, the invention includes any material which is entirely or substantially entirely in vitreous form and has been formed entirely or substantially entirely from at least one binary compound in zone A of the graph constituting FIG. 1 of the drawings herein and selected from the following class : chlorides, bromides, iodides, nitrides, sulphides, selenides and tellurides of elements in columns IIa, IVb, Vb, VIb, VIIb, VIII, Ib, IIb, IIIa and IVa of Mendeleeff's Periodic Table, and at least one binary compound in zone B of said graph and selected from the following class : chlorides, bromides, iodides, sulphides, selenides, tellurides and nitrides. The material may include incidental amounts of impurities.

Mendeleeff's Periodic Table is universally well known in the art of chemistry; however it has been found of interest to use the table by E.H. SARGENT, a full reference of which is given hereunder just before table I.

The upper curve in FIG. 1 closely approximates a graphical representation of the formula $(x + a)(y + b) = k$ wherein $x$ and $y$ are the co-ordinates of any point on the curve, measured along the abscissa and ordinate, respectively, $a = 6$, $b = 10$ and $k = 128$, whereas the lower curve closely approximates to a graphical representation of the same formula but in the case that $a = 10$, $b = 15$ and $k = 210$. The invention therefore includes any vitreous material as above defined but wherein zone A is a zone between upper and lower curves as defined by the foregoing formulae and drawn on a graph with abscissa and ordinate scales corresponding with those in FIG. 1 of the drawings herein, and zone B is a zone below the curve defined by the second of said formulae.

Certain elements in Mendeleeff's Periodic Table exist in a number of states of valency, to which different ionic radii (expressed in Angstrom Units) correspond. For instance, chromium can be positive and trivalent (radius of cation = 0.69) or positive and hexavalent (cation radius = 0.52). Nitrogen in the negative trivalent state has an anionic radius = 1.71. A distinction should therefore be made between an NCr compound and an $N_2Cr$ compound. The relation between the radii of the anion and cation of NCr is $1.71/0.69 = 2.48$, while the relation between the valences of the cation and anion is : 1:1. On the other hand, the relation between the radii of the anion and cation of $N_2Cr$ is : $1.71/0.52 = 3.3$, while the relation between the valences of the cation and anion is: 2:1. If the points respectively representing NCr and $N_2Cr$ are marked on the graph constituting FIG. 1, it will be noted that NCr is located in zone B whereas $N_2Cr$ is located in zone A of the graph.

The values of the valences and ionic radii of the simpler elements are generally well known, with a good degree of precision; for instance, use can be made of the tables by E.H. SARGENT and Co. (Scientific laboratory instruments, apparatus and chemicals) published in 1964 (copyright Number S. 18,806). The majority of these elements are listed in Table I below, together with their most characteristic states of valency and the related ionic radii.

TABLE 1

| Periodic System | Valences | Ionic radius A |
|---|---|---|
| Group Ia | | |
| Lithium | +1 | 0.60 |
| Sodium | +1 | 0.95 |

| | | | |
|---|---|---|---|
| | Potassium | +1 | 1.33 |
| | Rubidium | +1 | 1.48 |
| | Cesium | +1 | 1.69 |
| Group 2a | | | |
| | Beryllium | +2 | 0.31 |
| | Magnesium | +2 | 0.65 |
| | Calcium | +2 | 0.99 |
| | Strontium | +2 | 1.13 |
| | Barium | +2 | 1.35 |
| Group 3b | | | |
| | Scandium | +3 | 0.81 |
| | Yttrium | +3 | 0.93 |
| | Lanthanides | +2 to +4 | 0.92 to 1.15 |
| | Actinides | +2 to +3 | 0.85 to 1.18 |
| Group 4b | | | |
| | Titanium | +4 | 0.68 |
| | Zirconium | +4 | 0.80 |
| Group 5b | | | |
| | Vanadium | +5 | 0.59 |
| | Niobium | +5 | 0.70 |
| | Tantalum | +5 | 0.73 |
| Group 6b | | | |
| | Chromium | +3 | 0.69 |
| | | +6 | 0.52 |
| | Molybdenum | +4 | 0.68 |
| | | +6 | 0.62 |
| | Tungsten | +4 | 0.64 |
| | | +6 | 0.68 |
| Group 7b | | | |
| | Manganese | +2 | 0.80 |
| | | +7 | 0.46 |
| Group 8 | | | |
| | Iron | +2 | 0.76 |
| | | +3 | 0.64 |
| | Cobalt | +2 | 0.78 |
| | | +3 | 0.63 |
| | Iridium | +4 | 0.66 |
| | Nickel | +2 | 0.78 |
| Group 1b | | | |
| | Copper | +1 | 0.96 |
| | | +2 | 0.69 |
| | Silver | +1 | 1.26 |
| | Gold | +1 | 1.37 |
| Group 2b | | | |
| | Zinc | +2 | 0.74 |
| | Cadmium | +2 | 0.97 |
| | Mercury | +2 | 1.10 |
| Group 3a | | | |
| | Boron | +3 | 0.20 |
| | Aluminum | +3 | 0.50 |
| | Gallium | +1 | 1.48 |
| | | +3 | 0.62 |
| Group 4a | | | |
| | Carbon | −4 | 2.6 |
| | | +4 | 0.15 |
| | Silicon | −1 | 2.71 |
| | | +4 | 0.41 |
| | Germanium | +2 | 0.93 |
| | | +4 | 0.53 |
| | Lead | +2 | 1.20 |
| | | +4 | 0.84 |
| Group 5a | | | |
| | Nitrogen | −3 | 1.71 |
| | | +5 | 0.11 |
| Group 6a | | | |
| | Oxygen | −2 | 1.40 |
| | Sulphur | −2 | 1.84 |
| | Selenium | −2 | 1.98 |
| | Tellurium | −2 | 2.21 |
| Group 7a | | | |
| | Fluorine | −1 | 1.36 |
| | Chlorine | −1 | 1.81 |
| | Bromine | −1 | 1.95 |
| | Iodine | −1 | 2.16 |

From the above table of valences and ionic radii it can be quickly determined whether a given binary compound falls in zone A or zone B of the graph. Thus, the compound $V_2S_5$ is a sulphide of an element of column $Vb$ of the Periodic Table, and the table of valences and ionic radii shows that the relation between the valences of the cation and anion = 2.5 and the relation between the radii of the anion and cation = 1.84/0.59 = 3.12. The representative point of this compound therefore falls in zone A of the graph constituting FIG. 1. The compound $V_2S_5$ will therefore form a vitreous material if it is combined with a sulphide, selenide, telluride, nitride, chloride, bromide or iodide having its representative point in zone B of the graph shown in FIG. 1, for instance $CaCl_2$ or $Na_2S$ or $Na_2Se$.

Compounds having their representative points in zone A of the graph in FIG. 1 and selected from the class: chlorides, bromides, iodides, nitrides, sulphides, selenides, tellurides of elements in columns IIa, IVb, Vb, VIb VIIb, VIII, Ib, IIb, IIIa and IVa of Mendeleeff's Periodic Table function as glass lattice-formers. The proportion of such a glass lattice-former in the selected mixture of compounds belonging to zones A and B influences the temperature and other conditions under which the mixture can form a glass. In general, it is desirable for the mixture to contain at least 50 percent by weight of one or more of the glass lattice-formers of zone A in order that the mixture may be formed into a glass for forming articles of practical use in industry, and as will hereafter appear, the recommended minimum proportion to be observed when certain of the said lattice-formers are used is somewhat higher.

The tendency to vitrification of some binary compounds in the specified class of compounds with representative points in zone A of the graph shown in FIG. 1 is such that they can form glasses even when their proportion is higher than 95 percent of the total. This applies inter alia to the binary compounds: $ZnBr_2$, $ZnI_2$, $MgCl_2$, $CdBr_2$, $CuI_2$, $TiS_2$.

The various oxides which are often used in glass-forming batches are not used in glasses according to the present invention. However, it is of interest to note that if the representative points of the said oxides are shown on a graph according to FIG. 1, the representative points of some of them coincide with the representative points of certain compounds which can be selected for carrying out the present invention. Thus, for example, the compounds $GeO_2$ and $TiS_2$ have nearly the same representative point ($Vc/Va = 2$; $Ra/Rc = 2.7$). In fact, it has been observed that analogies exist between the behaviour of glasses based on $GeO_2$ and $TiS_2$. This points to an important potential use for glasses according to the invention. They can be used as models in experiments to ascertain particular properties of conventional glasses. The properties of the glasses according to the invention, although analogous in many cases to conventional glasses, can be more easily determined. For example, it is known that silica glasses are very resistant to irisation, i.e., to the action of water. To study their resistance, they have to be subjected for many weeks or months to the action of water in special irisation chambers. This applies, for example, to a glass composed of $SiO_2$, $Na_2O$, $Li_2O$. It has been found that a glass according to the invention, having the formula $GeS_2$, $K_2S$, $Na_2S$ is much more quickly attacked by water, but if the measurements on the sulphide glasses are suitably calibrated on the basis of experimental data comparing the behaviour of the two glasses, such measurements do serve as a measure of the behaviour of the analogous oxide glass.

Since some glasses, inter alia sulphide glasses, according to the invention are hygroscopic, they can also be used, for instance, in the form of small balls, for the improvement of soils, since they can slowly neutralize certain harmful constituents of the soil.

Some glasses according to the invention can be used in the form of small balls to yield constituents in chemical reactions. The balls can be of uniform size, so that there is little risk of the reactor becoming clogged. The balls are able to yield their constituents at a uniform rate to some reagents. By way of example, sulphur glasses can be used in reactors for the manufacture of mercaptans.

According to certain preferred embodiments of the invention, the vitreous material comprises at least 50 percent by weight (preferably at least 60 percent by weight) of one or more binary compounds having its representative point in zone A of the graph forming FIG. 1 and selected from the following groups: chlorides, bromides, iodides, nitrides, sulphides, of the elements of columns IIa, IVb, Vb, VIb, VIIb, VIII, Ib, IIb, IIIa and IVa of the Periodic Table, and one or more binary compounds having or each having its representative point in zone B of the graph forming FIG. 1 and selected from the following group: chlorides, bromides, iodides, sulphides and nitrides. These glasses have a particularly high refractive index, so that they are useful for small reflecting balls or reflecting panels for highway signs. For example, a glass of composition $GeS_2$ (55 percent) ZnS (35 percent) $Na_2S$ (10 percent) has a refractive index of 2.47. They also have considerable thermal stability; for instance, a glass $GeS_2$ (65 percent) $Na_2S$ (35 percent) remains substantially unoxidized after six hours of exposure to air at 450°C.

Within the said preferred range of compounds in the different zones, the most preferred compounds are, in zone A: chlorides, bromides and nitrides, of the elements of columns IIa, IVb, Vb, VIb, VIIb, VIII, Ib and IIb of the Periodic Table, and, in zone B: chlorides, bromides, iodides, sulphides and nitrides.

Very useful glasses can, however, also be formed from mixtures incorporating, as the compound or compounds of zone A, one or more selenides and/or one or more tellurides of an element or elements in columns IIa, IVb, Vb, VIb, VIIb, VIII, Ib, IIb, IIIa and IVa of the Periodic Table. Such selenides and tellurides do not form lattices so readily as the other compounds which can be used as the zone A compounds in carrying out the invention and, if used, they should in general constitute at least 60 percent by weight of the total mixture.

Glasses with various special properties can be made according to the invention. Thus, for example, glasses formed from a binary compound or compounds selected from the chlorides and bromides of magnesium and beryllium and one or more of the binary compounds; CaS, $CdCl_2$, $PbBr_2$, NaI and AlN, melt readily and have an extended working range, so that they can even be drawn in the form of sheets or ribbons by traditional methods. Thus, a glass comprising $MgCl_2$ (70 percent) $PbBr_2$ (20 percent) NaI (10 percent) has a viscosity varying from $10^{-4.5}$ to $10^{-5}$ for temperatures of 700°–600°C. The drawn sheets have a considerable absorption (90 percent) in the infrared.

The binary compound or compounds of zone B can be selected to give the glass special tints, for instance:
Cd compounds: brownish-red
Na compounds: white to yellow
$Fe^{++}$ compounds: gray.

Some hygroscopic glasses, for instance $GeCl_4$ (70 percent) $Na_2S$ (30 percent) can be drawn or cast in the form of sheets which are then sandwiched between two sheets of non-hygroscopic glass so as to form a strong assembly having special adsorptive and color properties.

Glasses according to the invention have different stabilities depending on their composition, and particularly on the position of the representative point of the zone B constituent within the area of that zone. Glasses according to the invention will devitrify to a greater or lesser extent under the influence of suitable heat treatment or even spontaneously, if they are maintained during a sufficient time within a temperature region favoring devitrification. For any given glass composition such a temperature region an easily be determined. Vitro-crystalline materials can be prepared, e.g., by choosing the heating and cooling schedule for the melting and subsequent solidification of the batch, so that at least one crystalline phase appears in addition to a vitreous phase or phases. Alternatively, a said vitro-crystalline material can be prepared by first preparing an entirely or substantially entirely vitreous material according to the invention and subsequently reheating and cooling this vitreous material provided an appropriate heating and cooling schedule is observed. Accordingly, while the present invention as so far defined is concerned essentially with material which is entirely or substantially entirely vitreous, we also lay claim herein to any vitro-crystalline solid mass formed from binary compounds selected as hereinbefore defined, the greater part by weight of the material being in vitreous state.

In selecting the ingredients for making a glass according to the invention there are advantages to be gained if a binary compound having its representative point in one or more specific sub-zones within the B zone of FIG. 1 is selected as the B zone constituent of the glass in order to realize particular properties. FIG. 2 of the accompanying drawings is a graph corresponding to the graph constituting FIG. 1 but with certain additional curves which divide the B zone into sub-zones BI, BII, BIII and BIV.

If the binary compounds useful as zone A compounds in carrying out the present invention are regarded as glass lattice-formers, the binary compounds lying in zone BI, such as $CaCl_2$, $CoCl_2$ may be considered to be intermediate compounds sometimes acting as lattice-formers and sometimes as lattice-modifiers.

The combination of a binary compound of sub-zone BII in FIG. 2 with one or more compounds of zone A, leads to the formation of glasses known as "phase separation" glasses above the liquidus, i.e., in the molten state they have a tendency to separate into two or more phases of different compositions. This is the case with BaS, $Li_2S$, NaCl, NaI, BaTe, SrTe, NaBr, SrSe.

Specific mention is in particular warranted of glasses according to the invention wherein the binary compound in zone B, or if there is more than one such compound, then at least one of them, is a chloride, bromide, iodide, sulphide, selenide, telluride or nitride in zone BIII of the graph constituting FIG. 2. Such zone BIII compounds include RbCl, CsBr, CsI, $Na_2S$, $K_2S$, $Cs_2S$, $Ba_3N_2$, $K_2Te$ and $K_2Se$. The use of a zone BIII compound in combination with a zone A compound leads to the formation of "phase separation" glasses below the liquidus, i.e., in the solid state their structure is resolved into two or more finely dispersed phases. These phases, which are visible only under the electron microscope, can be stabilized, and often even partially crystallized, by means of a suitable heat treatment. This partial devitrification often leads to an improvement in the mechanical properties of the material. If the various crystals appearing have the same refractive index as the vitreous phase, the vitro-crystalline material can be transparent (depending on its chemical composition). If different phases do not have the same refractive index, the material will be translucent or even opaque.

If the above compositions including a constituent or constituents in zone BIII are very rapidly cooled from the molten state, e.g., by casting, this prevents the formation of devitrified phases.

Other materials according to the invention which warrant specific mention are materials wherein the binary compound in Zone B, or if there is more than one such compound, then at least one of them, is a sulphide or nitride in zone BIV of the graph constituting FIG. 2. Examples of such BIV compounds are: $Cs_2S$ and $Cs_3N$. The BIV compounds act as lattice-modifying agents and real stabilizers of the glass lattice, and they lower the melting temperature of the batch.

Just as for the upper and lower curves defining zone A, the other curves in FIG. 2 correspond or closely approximate to graphical representations of formulae of the type $(x + a)(y + b) = k$ wherein $x$ and $y$ are the coordinates of any point on the curve, measured along the abscissa and ordinate respectively. For the lower of the two curves defining zone BI, $a = 8.5$, $b = 11$ and $k = 130$. For the lower of the two curves defining zone BII, $a = 18.1$, $b = 32$ and $k = 635$. For the lower of the two curves defining zone BIII, $a = 5.4$, $b = 8$ and $k = 54$.

It is here observed that while it is possible to form a vitreous material from a composition combining a zone B compound and a compound having its representative point above the upper boundary of zone A, such a material would be vitreous only at very low temperatures and would therefore have no practical use. For example, a batch composed of 95 percent by weight of $CS_2$ (abscissa value 4:2 = 2, ordinate value 1.84 : 0.15 = 12.3) and 5 percent by weight of $Na_2S$ can be formed into droplets of vitreous material in liquid nitrogen.

Vitreous and vitro-crystalline material according to the invention can be formed into various shaped bodies, such as sheets (e.g., thin sheets of the order of a few millimeters in thickness), balls and fibers. The shaping can be achieved, e.g., by drawing, rolling or centrifuging, depending on the viscosity of the material. It will often be advantageous to cool the material quickly, for example, by casting it on a cold plate, or in a cooled mold, so as to avoid devitrification. This precaution is more particularly desirable with vitreous materials, containing binary compounds of zones BII and BIII of the graph forming FIG. 2.

The present invention includes any method wherein a vitreous material is formed by melting and then cooling to solid condition a mixture composed entirely or substantially entirely of at least one binary compound having its representative point in zone A of the graph constituting FIG. 1 or 2 and selected from the class: chlorides, bromides, iodides, nitrides, sulphides, selenides and tellurides of elements in columns IIa, IVb, Vb, VIb, VIIb, VIII, Ib, IIb, IIIa, IVa of Mendeleeff's Periodic Table, and at least one binary compound having its representative point in zone B of such graph and selected from the class: chlorides, bromides, iodides, sulphides, selenides, tellurides and nitrides, the zone A compound or compounds forming a sufficient proportion of the total mixture to serve as a glass-former or glass-formers, and the heating and cooling schedule being such that the whole or substantially the whole of the solid mass is in a vitreous state. The invention also includes any such method but wherein each of the upper and lower boundaries of zone A is a curve representing the formula $(x + a)(y + b) = k$ wherein $x$ and $y$ are the coordinates of any point on the curve, measured along the abscissa and ordinate respectively, the constants $a$, $b$ and $k$ being 6, 10 and 128, respectively, for the upper curve and 10, 15 and 210, respectively, for the lower curve.

Advantageously, the formation of a glass from the mixed binary compounds, involving heating of the batch to or above the melting temperature and then cooling, is performed in an oxygen-free atmosphere. This is particularly desirable if the binary compounds contain water.

Some binary compounds, for instance, the alkali metal sulphides, are hygroscopic and can not be cheaply produced in anhydrous condition. Particularly if any of the binary compounds contain water, it is advantageous to perform the heating and cooling of the batch in an atmosphere of hydrogen, nitrogen or argon or an atmosphere composed of one or more elements of which anions are present in a binary compound or compounds of the mixture. Sulphides are advantageously treated in a sulphur or hydrogen sulphide atmosphere. Similarly, selenides can be treated in a gaseous selenium atmosphere. As further examples, glasses composed of sulphides, chlorides and selenides can be treated in a hydrogen sulphide atmosphere.

It is possible to prepare binary compounds in strictly anhydrous state by combining a metal and a metalloid in an atmosphere of the metalloid. For instance, lead sulphide can be prepared by bringing lead and sulphur together at elevated temperature in a sulphur atmosphere.

The invention as hereinbefore defined enables glasses to be formed without using any of the glassformers hitherto regarded as an essential constituent of glass-forming batches. There is no need to use any constituent other than binary compounds selected as hereinbefore defined in order to prepare glasses with very useful properties. Nevertheless, it is possible to include a minor proportion of some other constituent or constituents compatible with the formation of a glass and the invention includes materials and methods as hereinbefore defined but with this modification. Possible additional ingredients are halogens, sulphur, selenium, tellurium and arsenic. Such an additional constituent or constituents may be present up to a maximum proportion of, e.g., 10 percent by weight. Certain ingredients which are common constituents of conventional glasses, such as silicates, borosilicates and oxides appear to be incompatible with the objects in view.

DESCRIPTION OF THE PREFERRED EMBODIMENTS

The invention and its advantages will be better understood from the following description of a number of non-limitive embodiments thereof.

Referring more particularly to the following table II, which gives numerous specific examples of glasses according to the invention, it is to be noted as a general rule that the percentage of the compound in zone A should not be less than 30 percent unless one wishes to have an important concentration of devitrifications and in any case an heterogeneous glass. This percentage of the compound in zone A should not exceed 80 percent because above this value the mixture is only melting at high temperature, so much the more that the other constituents, taken from zone B, can show a tendency to volatilize without any useful effect. As to the other constituents, taken from zone B, although they have specific properties, according to the fact that they belong to one of underzones BI, BII, BIII or BIV, they can generally be used either alone, or in combinations, in such proportions that they complete the percentage of the compounds of zone A to reach a total mixture of 100 percent. As a general rule also, the greater is the amount of compounds of zone B, the lower temperature will be required to melt the batch. Therefore some batches comprising up to 70 percent of compounds of zone B are already melting at 300°C. Other batches containing up to 80 percent of a compound in zone A are only melting at 1700°C.

Preferably, the compounds forming the batch should be of a high purity, in order to avoid some unexpected results, such as undesirable colorations. Each compound can be formed for instance by the reaction at appropriate temperature of the chemical elements of which it is composed, in an atmosphere of neutral gas. Preferably, the various compounds should be divided into as small particles as possible, perfectly mixed together and then slowly heated until completely melted, preferably in an atmosphere composed of one or several of the metalloids of which one or several compounds are composed. Then the glass should be shaped for instance into the form of a sheet and cooled as quickly as possible, preferably in a neutral atmosphere, such as helium or argon.

EXAMPLE 1 TO 18

Figure 1:
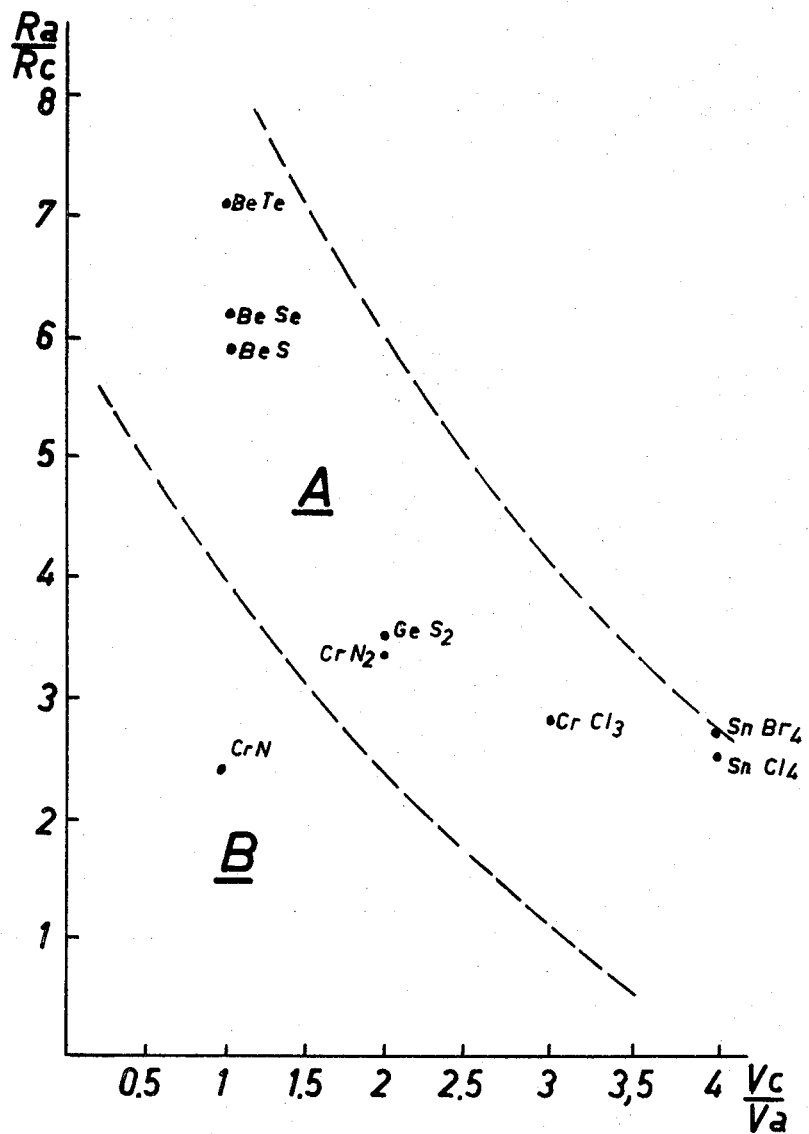
Figure 2:
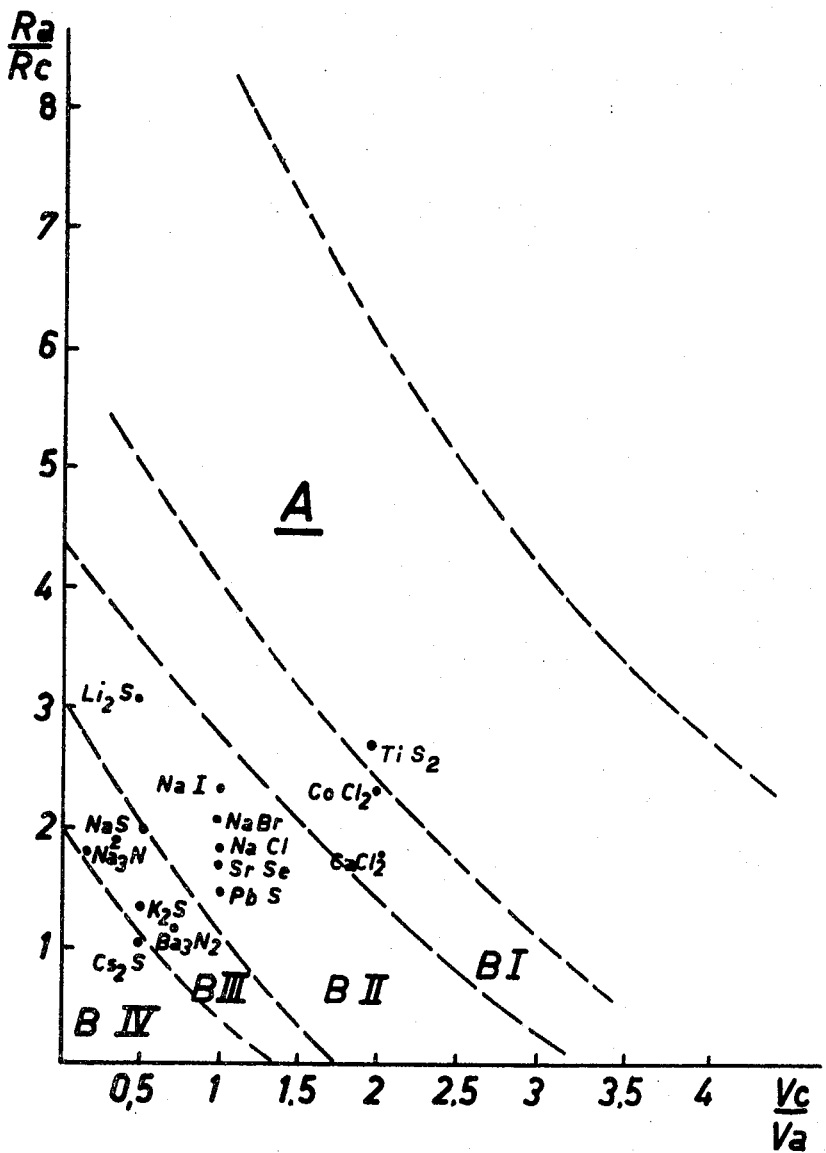

Eighteen different glasses were prepared having the compositions numbered 1 to 18 in Table II below. The percentages are by weight on the basis that the binary compounds are anhydrous. In the Table the binary compounds are classified in the zone or sub-zone of the graph forming FIG. 2 to which they belong.

The batches were heated to the temperatures specified in the last column of the Table. Many of the batches melt at appreciably lower temperatures than the temperatures indicated, but the use of lower temperatures increases the duration of the process. Heating and cooling were performed in an atmosphere consisting of 95 percent nitrogen and 5 percent hydrogen.

Glass No. 1 is slightly yellowish and very transparent. Glass of this composition shows no devitrification if it is rapidly cooled between 600° and 500°C (in a time of less than 2 minutes). A suitable heating and cooling schedule is as follows:

Heating 20° to 580°C in 30 minutes; 580°C to 600°C in 5 minutes. Duration at 600°C: 15 minutes.
Cooling: 600°C to 500°C in 100 seconds; 500°C to 20°C in 30 minutes. This glass can serve as a model for a glass comprising $SiO_2$(70 percent) $Na_2O$ (15 percent) $Li_2O$ (15 percent), since its hydrolytic resistance (tendency to irisation) is nine times less than that of an oxide glass.

A comparison of glasses 2, 3 and 4 shows that the melting point is slightly lower when selenium or tellurium is substituted for sulphur. Moreover, the chemical stability of the glass in relation to water improves when the selenide is substituted for the sulphide, and more so when the sulphide is substituted by the telluride.

In glasses 2, 3 and 4, the $TiS_2$ which is classified in the zone A of the intermediate compounds, seems to act as a lattice-former.

Glasses 5 and 6 melt readily and are readily obtained without devitrification, more particularly glass No. 6, whose lattice seems to be stabilized by the presence of 10 percent of $Cs_2S$. When glass 5 is heated for one hour at 450°C, it undergoes a phase separation and is converted into a white, opaque vitroceramic.

Glass No. 7 is difficult to melt, but is transparent and colorless, without devitrification after cooling. It is resistant to the action of water.

Glass No. 8 is transparent and colorless and melts readily.

Glass No. 9 is transparent, has a pink tint, and when reheated for one hour at 610°C forms a brown translucent matrix of very high mechanical and chemical strength.

To avoid devitrification, glass No. 10 must be cooled very suddenly from 620°C to 550°C. In contrast, glass No. 11 is much more stable and does not devitrify.

Glass No. 12 is fairly readily dissolved by water, and can be used in reactors, for instance, for the manufacture of mercaptans, in which it slowly and regularly gives up the sulphur it contains. The beryllium entrained can be removed chemically from a solution. A glass of this kind, which has intense absorption in the

TABLE II

| Number: | Zone A, percent | | Zone BI, percent | | Zone BII, percent | | Zone BIII, percent | | Zone BIV, percent | | Temperature, °C |
|---|---|---|---|---|---|---|---|---|---|---|---|
| 1 | $GeS_2$ | 70 | | | | | $K_2S$ / $Na_2S$ | 15 / 15 | | | 600 |
| 2 | BeS / $TiS_2$ | 60 / 10 | | | $Li_2S$ | 30 | | | | | 550 |
| 3 | BeSe / $TiS_2$ | 60 / 10 | | | $Li_2S$ | 30 | | | | | 520 |
| 4 | BeTe / $TiS_2$ | 60 / 10 | | | $Li_2S$ | 30 | | | | | 510 |
| 5 | BeTe / $TiS_2$ | 60 / 10 | | | $Li_2S$ | 20 | $K_2S$ | 10 | | | 500 |
| 6 | BeTe / $TiS_2$ | 60 / 10 | | | $L_2Si$ | 10 | $K_2S$ | 10 | $Cs_2S$ 10 | | 490 |
| 7 | $CrN_2$ | 60 | | | | | $Ba_3N_2$ | 10 | $Cs_2S$ 30 | | 1,400 |
| 8 | BeS | 70 | $CaCl_2$ | 20 | NaI | 10 | | | | | 560 |
| 9 | $SnCl_4$ | 65 | $CoCl_2$ | 25 | | | RbCl | 10 | | | 690 |
| 10 | $SnBr_4$ | 65 | | | NaCl | 35 | | | | | 650 |
| 11 | $SnBr_4$ | 65 | | | SrSe | 20 | | | $Cs_2S$ 15 | | 620 |
| 12 | BeS | 70 | | | | | $Na_2S$ | 30 | | | 510 |
| 13 | BeS | 70 | | | PbS | 25 | $Na_2S$ | 5 | | | 800 |
| 14 | BeS | 70 | | | ZnS | 25 | $Na_2S$ | 5 | | | 1,210 |
| 15 | BeS | 70 | | | CeS | 25 | $Na_2S$ | 5 | | | 1,320 |
| 16 | BeS | 70 | | | FeS | 25 | $Na_2S$ | 5 | | | 980 |
| 17 | BeS / BeTe | 35 / 35 | | | NaBr | 30 | | | | | 580 |
| 18 | $CrN_2$ / $CrCl_3$ | 35 / 35 | $CaCl_2$ | 10 | NaBr | 20 | | | | | 1,210 | infrared, can be used as a glazing, so long as it is sandwiched between two sheets of ordinary glass or transparent plastics. In contrast, glasses 13, 14, 15 and 16 are highly stable with respect to oxidizing agents, up to temperatures of 400°–500°C, and to water; they are variously tinted, from yellowish to a reddish-brown.

Glass No. 17 smells slightly of sulphur and is fairly hygroscopic.

Glass No. 18 is relatively meltable and highly stable with respect to oxidizing agents or humidity, at least up to 700°C. It is translucent and has greater hardness than a normal silica and soda glass.

By way of example, glass No. 11 has a viscosity of $10^{-4.5}$ to $10^{-5}$ when the temperature varies between 600° and 540°C.

The vitreous materials of the Table can be worked into sheets (for instance, by drawing or casting) and they can be formed into large cast articles, fibers or balls.

EXAMPLE 19

A glass was prepared from a batch composed of $GeS_2$ (80 percent) $Na_2S$ (10 percent) and $CdS$ (10 percent), the molten glass being cast to form rods measuring 1 cm × 1 cm × 10 cm. Table III shows some elongation values in percentages of the initial length, in relation to temperature: the coefficient of expansion can be deduced from these values.

TABLE III

| Elongation in % of Length at 20°C | Temperature: °C |
|---|---|
| 0 | 20 |
| 0.16 | 100 |
| 0.30 | 200 |
| 0.36 | 300 |
| 0.40 | 350 |

EXAMPLE 20

A glass having the formula $TiS_2$ (70 percent) NaCl (10 percent) $CdBr_2$ (20 percent), was prepared and drawn in sheets having a thickness of 2 mm.

Table IV shows a number of values of light transmission between 2,500 and 10,000 millimicrons. The transmission values are the peaks (either maximum or minimum).

TABLE IV.

| Wavelength in Millimicrons | % of Transmission |
|---|---|
| 2,400 | 78 |
| 2,500 | 80 |
| 2,600 | 40 |
| 4,500 | 100 |
| between 7,000 and 8,000 | 0 |
| 8.400 | 10 |

EXAMPLE 21

A glass was prepared having the following composition by weight: $CrN_2$ (30 percent) $CrCl_3$ (40 percent) PbS (10 percent) $Na_2S$ (20 percent), which was then deposited in the form of a thin layer having a thickness of 20 microns by a known sputtering technique on an insulating sheet support. It was found that the layer thus deposited was semi-conductive.

Some glasses according to the invention have advantageous electronic properties, such as electroluminescence and photo-conductivity.

It will be understood that the above description of the present invention is susceptible to various modifications, changes, and adaptations, and the same are intended to be comprehended within the meaning and range of equivalents of the appended claims.

I claim:

1. An admixture suitable for forming a glass which consists essentially of 60 percent by weight of BeTe, 10 percent by weight of $TiS_2$, 10 percent by weight of $Li_2S$, 10 percent by weight of $K_2S$ and 10 percent by weight of $Cs_2S$.

2. Glass having a composition which consists essentially of 60 percent by weight BeTe, 10 percent $TiS_2$, 10 percent $Li_2S$, 10 percent $K_2S$ and 10 percent $Cs_2S$.

* * * * *